United States Patent [19]

Pichlmaier et al.

[11] Patent Number: 5,317,637
[45] Date of Patent: May 31, 1994

[54] DATA EXCHANGE SYSTEM WITH A CHECK OF THE APPARATUS FOR ITS AUTHENTICATION STATUS

[75] Inventors: Albert Pichlmaier; Gisela Meister, both of Munich, Fed. Rep. of Germany

[73] Assignee: GAO Gesellschaft fur Automation und Organisation mbH, Fed. Rep. of Germany

[21] Appl. No.: 995,458

[22] Filed: Dec. 22, 1992

[30] Foreign Application Priority Data

Dec. 24, 1991 [DE] Fed. Rep. of Germany ....... 4142964

[51] Int. Cl.⁵ .............................................. H04K 1/00
[52] U.S. Cl. ........................................ 380/25; 380/23; 380/24
[58] Field of Search .............................. 380/23, 25, 24

[56] References Cited

U.S. PATENT DOCUMENTS

| | | | |
|---|---|---|---|
| 4,458,109 | 7/1984 | Mueller-Schloer | 380/30 |
| 4,578,531 | 3/1986 | Everhart et al. | 380/21 |
| 5,224,164 | 6/1993 | Elsner | 380/44 |
| 5,231,668 | 7/1993 | Kravitz | 380/28 |
| 5,243,654 | 9/1993 | Hunter | 380/51 |

*Primary Examiner*—David C. Cain
*Attorney, Agent, or Firm*—Andrus, Sceales, Starke & Sawall

[57] ABSTRACT

The invention relates to a data exchange system wherein the entitlement of a user is detected by a check of a personal feature inputted by the user, comprising a data carrier associated with the user, an apparatus communicating with the data carrier and a display unit. The data of the data carrier contain a data word known only to the user that, before he is asked to input his personal feature, is transmitted to the apparatus in an encoded form and displayed to the user for comparison after being decoded by a cryptographic unit contained in the apparatus and characterizing the authenticity of the apparatus.

10 Claims, 2 Drawing Sheets

DATA EXCHANGE SYSTEM WITH A CHECK OF THE APPARATUS FOR ITS AUTHENTICATION STATUS

The present invention relates to a data exchange system according to the preamble of claim 1.

DE-C 26 21 269 discloses a data exchange system with a data carrier and an apparatus, the data carrier being provided with a memory. In this memory a personal feature, e.g. a personal identification number (PIN), of the legitimate user is stored for purposes of comparison.

Before a transaction can be performed with the data carrier in the data exchange system the user of the data carrier must input a personal identification number via the keyboard of the apparatus. This number is transmitted into the data carrier and tested there by a comparator for identity with the identification number associated with the legitimate user. In the positive case the data exchange system assumes that the legitimate owner of the data carrier wants to perform a transaction and gives a transaction enable.

As explained above, the PIN plays the essential part in the authorization test since any third party in possession of the data carrier and the corresponding PIN can abuse the data carrier. In the known system the PIN is inputted without the user being able to detect whether he is inserting his data carrier into a manipulated apparatus and his PIN is being abused.

The present invention is based on the problem of improving the security of the known data exchange system with respect to the processing of the personal feature.

This problem is solved by the feature stated in the characterizing part of claim 1.

The essence of the invention is that the user is given the possibility of checking the authenticity of the system or the apparatus in a simple way before disclosing his personal feature.

In a preferred embodiment of the invention the data word stored in the data carrier is an easily remembered code that, after being decoded by an authentic apparatus, appears on the display of this apparatus so that the user can assume the apparatus is authorized. Only an authorized apparatus is able to decode the code word since only it has the necessary decoding means.

In a further preferred embodiment the user can determine the data word and optionally change it at any time, preferably after correctly inputting his PIN.

In a further preferred embodiment the user's authenticity check of the system is integrated into the authentication method of the system components that is necessary anyway in most cases. Authentication of the system components, data carrier and apparatus, generally means that encoded messages are exchanged between the components and verified in one system component to check the authenticity of the other component.

In a further preferred embodiment the data word is integrated into the message to be transmitted from the data carrier to the apparatus.

In another preferred embodiment a data carrier with an IC having a memory and a control means is used. Such a data carrier is known for example from DE-A 27 38 113.

The invention shall be explained in more detail in the following with reference to the drawings, in which.

Figure 1:
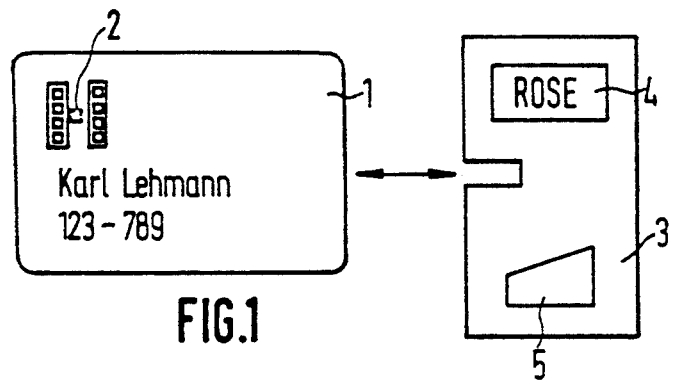
FIG. 1 shows a data exchange system with an IC card and a device.

The data exchange system according to FIG. 1 comprises an IC card 1 and a device 3. Each system component is provided with a programmable control means that effects the functional sequence described in the following figures. Device 3 is also provided with a display 4 and a keyboard 5. The device may be a terminal operated off-line or an on-line device connected with further equal-ranking devices of a central processing unit.

Figure 2:
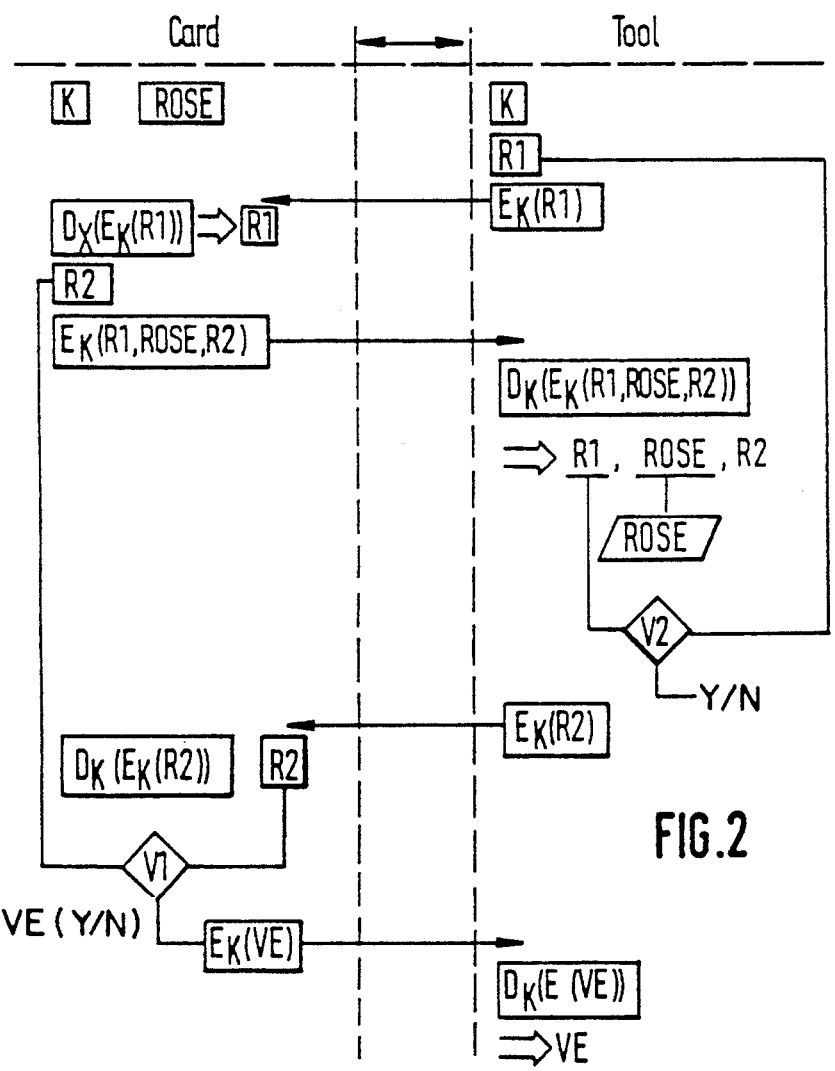
FIG. 2 shows an authentication sequence between card and device with the card user being able to check the device.

FIG. 2 shows the chronological data exchange between card 1 and device 3 for carrying out mutual authentication, i.e. a mutual authenticity check. This sequence also provides for the user of card 1 to be able to check the authorization of the device used by him.

An encoding/decoding means is provided both in card 1 or its integrated circuit 2 and in device 3. A code K necessary for operating the encoding/decoding means is provided both in the card and in the device. In the embodiment described here, this code K is the same in the card and in the device. The card and the device also each have a known random number generator and a comparator V1 or V2. A data word selected by the legitimate user is also stored in the card in the memory of integrated circuit 2.

At the onset of authentication the device generates a random number R1 that is encoded into a message by the encoding means using code K. This message is transmitted to the card via a communication connection and decoded by the decoding means of the card using code K. The result of this decoding is random number R1 generated by device 3.

The random number generator of the card then generates a random number R2 that is encoded into a message by the encoding means of the card using code K and transmitted to device 3 simultaneously with the device's random number R1 determined by the card and the data word ROSE selected by the legitimate user of the card. In the device this message transmitted from the card is fed to the decoding means of the device and decoded using code K. As the decoding result the decoding means provides the device's random number R1, the data word ROSE selected by the user and random number R2 generated by the IC of the card. Random number R1 decoded by the device and coming from the card message is fed to comparator V2 of the device, that compares this number with number R1 generated by the device and sent to the card in an encoded form. In the positive case the device assumes the card is authorized for data exchange, i.e. authentic.

The deciphered word ROSE of the card is then displayed on display 4 of device 3. The user of card 1 on device 3 is thus given the possibility to check whether display 4 of device 3 displays the data word selected by him so that he can make sure the device is authorized in the positive case. He is then safe to disclose his personal feature, i.e. his personal identification number.

So that the card can also detect the authenticity of the device, the encoding means of the device encodes the card's random number R2 decoded by the device and sends it to the card. The decoding means provided in IC 2 of the card decodes this message using code K, which yield the determined random number R2. This determined random number R2 is fed with random number R2 generated by the card to comparator V1 located in the card, that outputs a result of comparison VE corresponding in binary coding to a YES or NO. The result of this comparison can be encoded by the encoding means of the card using code K again, and transmitted to the device. Its decoding means decodes the message obtained from card 1. Result of comparison VE shows the device whether the card has performed the authentication process properly.

If both comparisons are positive the user is then asked by the data exchange system in the known way to input his personal identification number, i.e. his PIN. If the PIN inputted by the user of card 1 corresponds to the PIN stored in the system that was associated with the legitimate owner of the card, the data exchange system produces a transaction enable permitting the user of the card to perform his transactions, e.g. a money transfer. It is also conceivable for the transaction enable to give the user of the card access to a supervised area.

Figure 3:
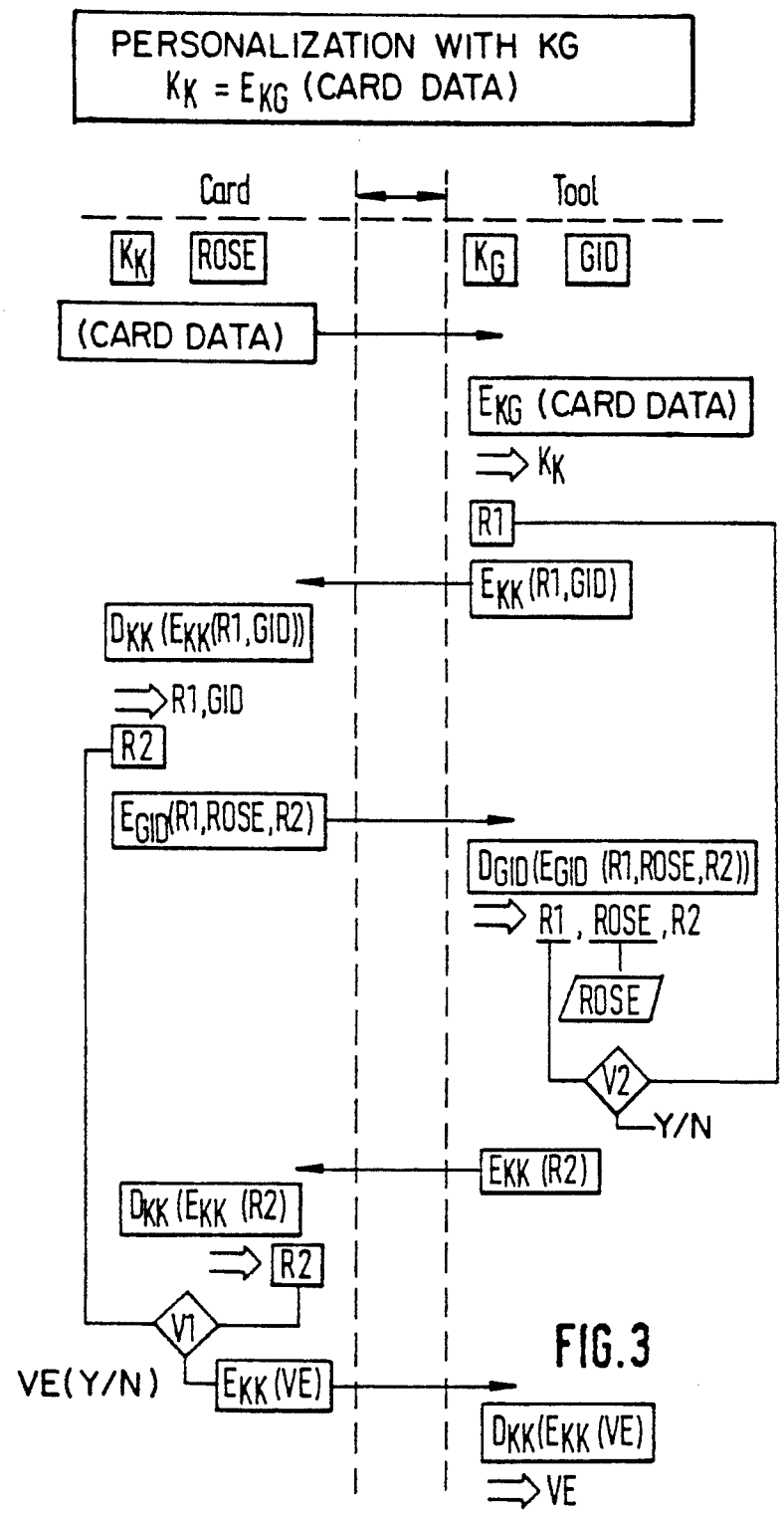
FIG. 3 shows an authentication sequence as in FIG. 2 wherein the card and device have different codes.

The authentication sequence between card 1 and device 3 shown in FIG. 3 differs from that in FIG. 2 in that the card and the device have different codes and the device also produces a device-specific parameter, in particular a separate random number. Like the data exchange system in FIG. 2, the data exchange system in FIG. 3 has separate encoding/decoding means, separate random number generators and separate comparing means in the card and the device.

A code KK and the data word ROSE selected by the legitimate card owner is stored in integrated semiconductor circuit 2 of card 1. The data characterizing the card, such as the bank sort code, card owner's account number, etc., are also stored in this integrated circuit. The term "card data" used below includes part or all of these user-specific data as well as code KK and the data word ROSE.

A device code KG and a device-specific parameter GID, or a separate random number generator generating parameter GID, are provided in device 3. The card code KK is linked with device code KG by the relation KK=EKG (card data).

The authentication sequence is initiated when the card sends the "card data" to the device. In the device the card data are encoded with code KG so that the device determines card code KK. The random number generator located in the device then produces, as in FIG. 1, a random number R1 that is encoded with a device-specific parameter GID using code KK. This message encoded by the encoding means of the device is sent to the card and decoded. As the result the decoding means of the card provides random number R1 generated by device 3 and device-specific parameter GID.

As in FIG. 2, random number generator in card 1 now generates a random number R2 that is encoded, with determined random number R1 of the device and the data word ROSE selected by the user, by the encoding means of the card using device-specific parameter GID as a code. This message is transmitted to the device and decoded by the decoding means of the device again using device-specific parameter GID. The decoding yields determined random number R1 of the device, the data word ROSE and determined random number R2 of the card. The word ROSE selected by the legitimate user of the card is displayed to the card user in plain language on display 4 of device 3 as in FIG. 2. Random number R1 generated by the device and random number R1 determined by the device are fed to a comparator V2 in device 3. If comparison is positive the device assumes the used card is an authorized card.

For card 1 to detect the authenticity of device 3, random number R2 determined by device 3 is encoded by the encoding means of the device using card code KK. This message is sent from device 3 to card 1 and decoded there by the decoding means of the card using card code KK. The result is determined random number R2, that is compared by comparator V1 in IC 2 of card 1 for identity with random number R2 generated by the card. Result of comparison VE is processed using code KK as in FIG. 2.

We claim:

1. A data exchange system wherein the entitlement of an entitled user is detected by a check of a personal feature inputted by the entitled user, comprising a data carrier associated with the entitled user, an apparatus communicating with the data carrier and a display unit, characterized in that a data word is stored on the data carrier in encoded form, said data word is assigned and known to the entitled user and is transmitted to the apparatus in an encoded form and displayed to the entitled user for comparison after being decoded by a cryptographic unit contained in the apparatus and characterizing the authenticity of the apparatus.

2. The data exchange system of claim 1, characterized in that the data word can be determined and changed at any time by the entitled user.

3. The data exchange system of claim 2, characterized in that the data word is a word easily remembered by the entitled user.

4. The data exchange system of claim 2, characterized in that the data word can only be changed after a positive comparison of the inputted personal feature with a feature stored in the system.

5. The data exchange system of claim 1, characterized in that the data carrier is an identity card, credit card or access card having an integrated circuit with memory and control means, the data word is deposited in an overwritable area of the memory, and the data word is encoded before being outputted to the apparatus by the control means of the integrated circuit.

6. The data exchange system of claim 5, characterized in that the control means is a program-controlled microprocessor.

7. The data exchange system of claim 4, characterized in that the transmission and encoding of the data word from the data carrier to the apparatus is included in an authentication process taking place between the data carrier and the apparatus.

8. The data exchange system of claim 6, characterized by an authentication process having the following steps:
the apparatus generates a first random number (R1) that is transmitted encoded to the data carrier;
the data carrier decodes the received message and forms a second random number (R2);
the data carrier encodes the first random number (R1), the data word and the second random number (R2);
the apparatus decodes the received message, compares the decoded random number with the random number produced in the device and, in case of agreement, displays the decoded data word on a display unit;
the apparatus sends the encoded second random number (R2) to the card;

the card decodes the message sent, compares the decoded second random number with the random number produced in the card and, if comparison is positive, sends an acknowledgement to the apparatus;

the apparatus asks the entitled user to input his personal feature.

9. The data exchange system of claim 7, characterized in that a device-specific parameter is included in the encoding on the device side.

10. The data exchange system of claim 8, characterized in that the device-specific parameter is a random number.

* * * * *